Feb. 28, 1928.
H. A. BORRESEN
AUTOMOBILE CURTAIN FASTENER
Filed Jan. 7, 1922  2 Sheets-Sheet 1
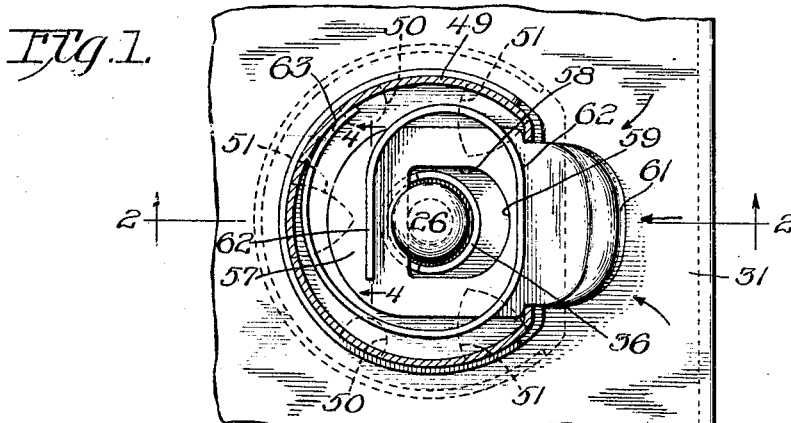
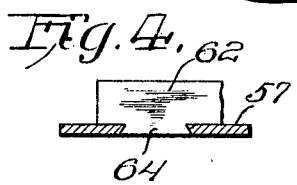
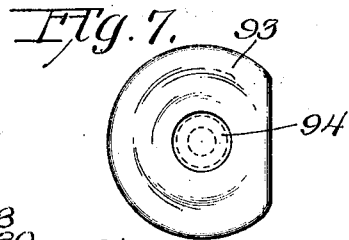
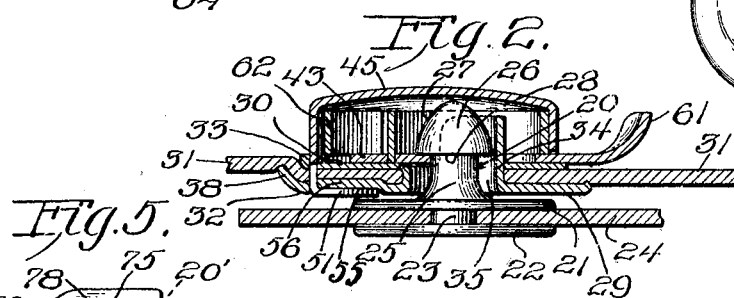
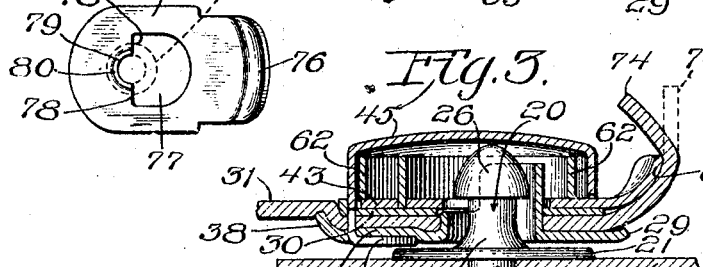
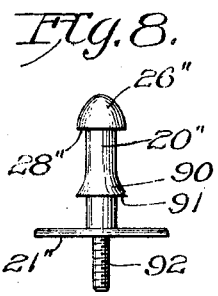
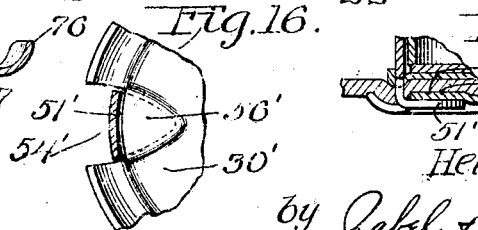
Inventor:
Helge A. Borresen
by Gabel & Mueller
Attys

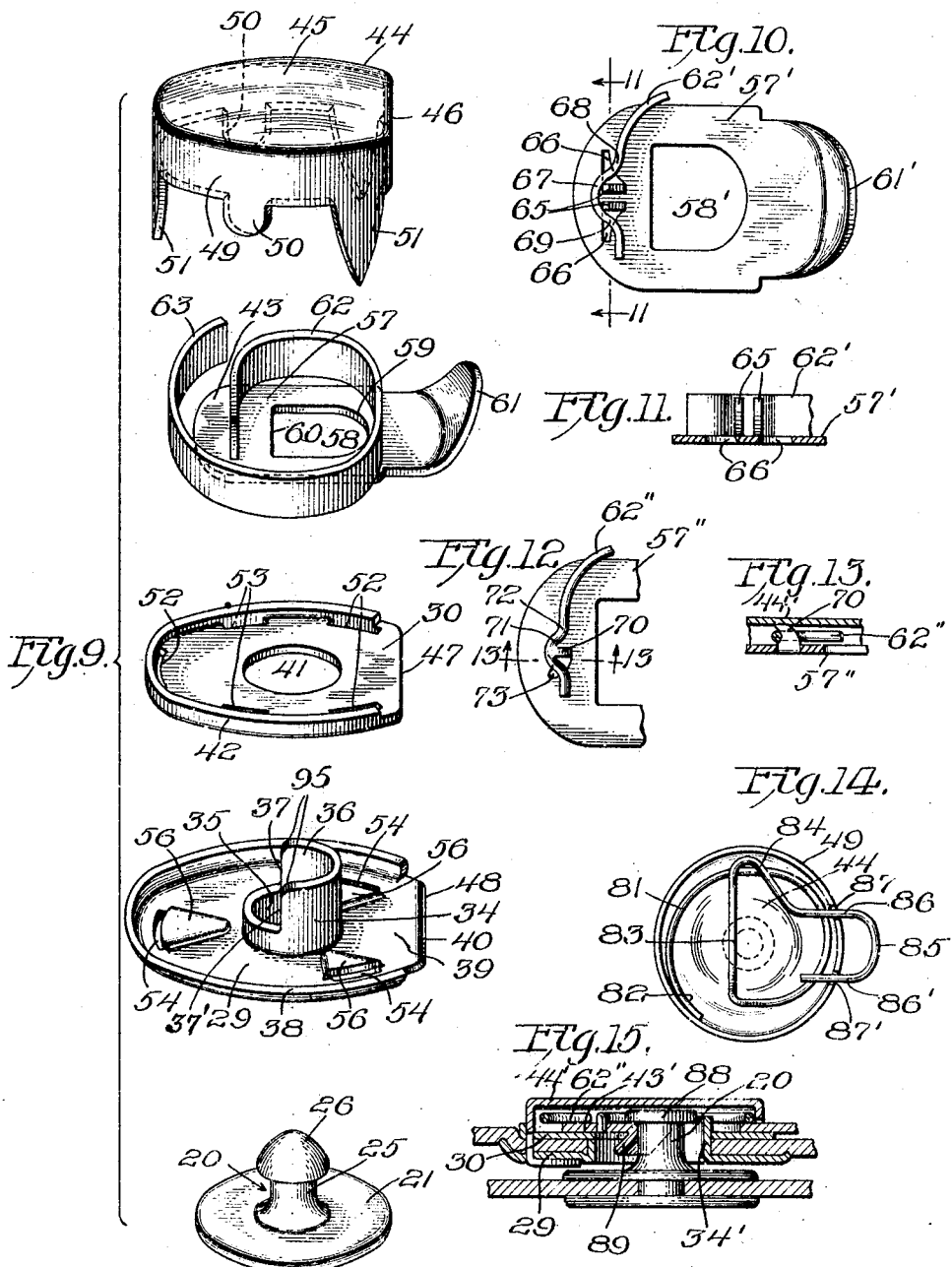

Patented Feb. 28, 1928.

1,660,473

UNITED STATES PATENT OFFICE.

HELGE A. BORRESEN, OF CHICAGO, ILLINOIS.

AUTOMOBILE CURTAIN FASTENER.

Application filed January 7, 1922. Serial No. 527,610.

My invention relates to socket latch lock fasteners for use on automobile curtains and various other objects requiring a simple, durable, compact and positive fastening. The attachment of the clasp to its coacting stud is performed by merely pushing the clasp down in the usual manner. The removal of the clasp is performed automatically by lifting the curtain or pulling the same back against the lock latch which extends beyond and outside of the clasp housing.

Among the useful objects attained by the invention are the provision of a closed clasp housing which excludes rain, the provision of a stud that is relatively much shorter than those in the prior art and the provision of a very compact clasp member whereby the curtain members carrying the separable parts of the fastener are held in close contact.

It is a further purpose of the invention to provide a separable fastener which has few and inexpensive parts, a maximum length of spring, whereby the efficiency of the spring is retained permanently due to the comparatively small amount of movement per unit of length necessary to produce the desired spring action and to provide a positively locking latch which prevents accidental unlocking of the parts due to the wind or other usual pressure, but which is very easily separated automatically by an easily effected upward or backward pull on the curtain itself without severe stress upon the curtain material.

More specifically it is an object of the invention to provide a separable fastener which is provided with an upstanding stud on one part thereof and a lock engaging said stud on the other part thereof which is actuated by a spring member, and which is provided with an outwardly extending lip portion which serves as an unlocking member, which lip portion is directed toward the free edge of the material upon which the fastener is mounted so that a pull on the material tending to roll the same from the free edge toward the central portion thereof will cause the material upon which said fastener is mounted to engage with the projecting lip to move the locking member backward into unlocking position, so as to provide for easy disengagement of the parts of the fastener.

Other objects and advantages of the invention will appear as the description of the accompanying drawings proceeds. However, it is to be distinctly understood that I do not intend to limit myself to the exact details shown or described, but that I intend to include as part of my invention all such obvious details and modifications of parts as would occur to a person skilled in this art and as would fall within the scope of the claims.

In the drawings:

Fig. 1 is a plan view of a fragmentary portion of a curtain or similar member upon which my improved separable fastener or clasp is mounted, said clasp being shown partly in plan and partly in section, the top portion of the cover being shown as being cut away;

Fig. 2 is a vertical sectional view of the clasp shown in Fig. 1 taken on the line 2—2 of Fig. 1 showing the stud in elevation, said clasp being shown in locked position in said figure;

Fig. 3 is a similar view of the clasp showing the same in unlocked position just prior to separation of the two parts of the clasp;

Fig. 4 is a fragmentary sectional view taken through line 4—4 of Figure 1 showing the actuating spring for the locking member riveted to the locking latch;

Fig. 5 is a plan view showing a modified form of locking latch;

Fig. 6 is a fragmentary sectional view of the structure shown in Fig. 5;

Fig. 7 is a top plan view of a modified form of clasp having a central aperture to be used where more than two edges of material are connected together by the fastener;

Fig. 8 is a double shouldered stud member for use in connection with the clasp shown in Fig. 7;

Fig. 9 is a view showing in perspective the various component parts of a complete clasp in disassembled relation, said parts being arranged in said figure in the same relationship in which they would be placed relative to each other in assembling;

Fig. 10 is a plan view of the locking latch showing lugs engaging a flat spring member to hold the same detachably connected with the locking latch, said spring being partly broken away;

Fig. 11 is a view taken on the line 11—11 of Fig. 10;

Fig. 12 is a fragmentary plan view similar to Fig. 10 showing a further modified form of fastening means for a wire spring;

Fig. 13 is a fragmentary sectional view of the structure shown in Fig. 12 showing a cover member associated therewith;

Fig. 14 is a plan view of the clasp showing the cover member removed, the locking latch and spring being formed of a single piece of spring wire in this form of the device;

Fig. 15 is a vertical sectional view showing a further modified form of fastener which is so constructed as to obtain a very compact structure;

Fig. 16 is a fragmentary view partly in plan and partly in section showing a modified form of supporting member for the separable fastener; and Fig. 17 is a fragmentary sectional view of the structure shown in Fig. 16.

Referring in detail to the drawings, the improved curtain fastener comprises a stud member 20 having a flange 21 and a flange 22 spaced from the flange 21 by means of the neck portion 23, said flanges 21 and 22 being adapted to clamp the flexible material 24 therebetween, said flexible material being preferably an automobile curtain or similar article. The stud 20 is provided with a shank portion 25 extending upwardly from the flange 21 and connecting the head 26 with the base portion of the stud member. The head 26 is preferably provided with a conical upper surface as shown at 27 and is formed so as to provide an abrupt shoulder at 28 as will be clear from Fig. 2. Cooperating with the stud member 20 is a bottom comprising a base plate 29, a plate 30 cooperating with the base plate 29 to clamp the flexible material 31, which is preferably an overlapping edge portion of an automobile curtain, between the same and the base plate 29, said plates 29 and 30 being provided with depressed portions 32 and 33 forming a groove and a cooperating rib respectively for clamping the material 31 between the plate 30 and the base member 29. The base member 29 is provided with an upstanding tubular portion 34 providing an opening 35 through which the stud 20 may be passed.

Referring to Fig. 9 it will be seen that the tubular member 34 is somewhat longer on one side thereof than on the other thus providing an extension 36 which serves as a guide for the stud in removing the bottom from the stud, and also serves to prevent the material 31 from entering the opening 35. The tubular member 34 is provided with abrupt shoulders at 37 and 37'. The portion 36 is slightly greater than semicylindrical, whereby the portions 37 and 37' are not diametrically opposite each other but the center of the opening will be inwardly toward the member 36 from such shoulders for a purpose to be described below. The edge portion of the base member 29 is provided with a peripheral flange 38 outwardly of the depressed portion 32, as will be clear from Fig. 9. Said flange 38 does not extend entirely around the periphery of the member 29 but a substantially flat portion is provided at 39 in the base member 29 having a slightly upturned lip portion 40. The member 30 is provided with an opening at 41 through which the tubular member 34 is adapted to pass, and is provided with a peripheral flange 42, said flange also extending only partially around the periphery of the member 30. A locking latch 43 is mounted on the member 30 and between said member 30 and the cap member 44. Said cap member 44 has a closed top as indicated at 45 in Fig. 9 and has a flattened side portion 46, the corresponding portions of the member 30 and 29 being also flattened as at 47 and 48 respectively.

The member 45 is provided with an angular side flange 49 from which the curved lugs 50 and the pointed prong-like lugs 51 depend. The lugs or prongs 51 extend through the openings 52 in the member 30 and the lugs 50 extend through the openings 53 in the member 30. The lugs 50 are bent at right angles to the flange 49 after being passed through the openings so as to rest on the under face of the member 30 and between the same and the member 29, while the prongs or lugs 51 extend through the openings 54 in the member 29 and are bent over against the outer surface of the member 29, so as to rest in the depressions 55 which are formed by striking up the portions 56 which are substantially triangular, as will be clear from Fig. 9, thus the members 44, 30 and 29 are secured together with a locking latch 43 positioned between the cap and the member 30. The closed top 45 of the cap 44 is spaced a sufficient distance from the member 30 so as to provide for the proper freedom of movement for the locking latch. The locking latch comprises a plate member 57 having an opening 58 therein which is elongated, and has a rounded end 59 and a straight end 60. The plate 57 is upturned at its end to form the lip 61 which is bent on a curve as shown in Fig. 9, and also has a rounded edge portion as shown in said figure. The tubular member 36 extends through the opening 58 and guides one end of the plate 57 in its movements into and out of locking position. The shoulders 37 and 37' cooperate with the edge 60 of the latch 43 to locate said latch relaltive to the other parts of the device and the rounded edges 95 automatically guide the latch 43 into place during the process of assembling.

Mounted on the member 57 is a spring 62 which is secured to the member 57 in any desired manner, and which is preferably shaped as shown in Figs. 1 and 9 of the drawings, said spring being curved on substantially arcs of circles and having the free end portion 63 thereof contacting with the inner face of the flange 49.

It will be noted that from the point of contact of the spring with the flange 49 to the point of securement thereof to the plate 57 the spring makes substantially a complete turn. The spring 62 may be secured to the member 57 by means of the integral lug 64, as shown in Fig. 4, this being especially desirable if the spring is made of flat material as shown in Figs. 1 and 9. However, the spring may be secured, as shown in Fig. 10, in which the plate 57' having the lip 61', similar to the lip 61, and the opening 58' is provided with a pair of upstruck lugs 65 which are cut out of the plate 57, as shown at 66, said lugs being substantially of the shape of the opening shown at 66. In this instance the spring 62', which is of the same shape in cross section as the spring 62, is provided with an offset portion 67 providing the curved portions 68 and 69, whereby the spring will be held in assembled relation to the plate 57' when the same is inside the cap 44. When a spring is used that is circular in cross section, as shown at 62'' in Fig. 12, the plate 57'' may be provided with a single upstruck lug 70 which is so shaped as to provide a hook-like portion engaging with the spring 62'' as shown in Fig. 13, said spring 62'' being provided with an offset 71 providing the outwardly curved portions 72 and 73 in a manner similar to the spring 62'. The hook-like portion 70 will prevent upward movement of the spring and the offset portion will hold the spring in assembled relation with the lug lengthwise of said spring. The hook 70 may also be of a length to reach the inner side of the cap so as to prevent the plate 57'' from being pushed out of alignment when the stud 26 is pressed into engagement with the cooperating member. When the device is in use the stud member is mounted on one layer of the material and the button is mounted on an overlapping layer. When it is desired to secure the overlapping layers of material together by means of the separable fastener shown, all that is necessary is to press the cap member down on the stud in the customary manner. When the cap member is thus pressed down on the stud, the locking member will engage with the conical surface 27 of the head 26 of the stud and the spring pressed locking member will be forced out of normal position so that the stud will pass through the opening 58 therein and into the opening in the tubular member 34. As the locking member passes beyond the shoulder 28 it springs back into such position as to lock the cap member to the stud.

In order to release the cap member from the stud, the free edge of the material is lifted up or pulled back, as shown at 74 by exerting an upward pull on the same, or a pull away from the free edge toward the central portion of the material. The material will then engage with the curved lip 61 and will force the locking member toward the left in Fig. 3, thus unlocking the cap member from the stud.

It will be noted that the locking member 43 cannot be moved except by an endwise pressure thereon. Accordingly the fastener will not accidently become unlocked but will be automatically unlocked when the latch member 43 is moved due to engagement of the material 74 therewith or manually unlocked by a pressure of the finger thereon toward the main body portion of the fastener. Due to the curved edge portion of the member 61 a force acting thereon both centrally and from an oblique angle, as shown by the arrows in Fig. 1, will move the locking latch to unlocking position. By providing a spring 62 that is relatively of great length for the locking latch, the life of the spring is greatly extended over shorter springs, which have been previously used for devices of this character.

Instead of making the locking latch as shown in Figs. 1 to 3 inclusive, the same may be made as shown in Figs. 5 and 6, in which the locking latch 75 having the curved lip 76 and the opening 77 is shown. The opening 77 in said locking latch instead of having the straight portion 60 is provided with short straight shoulders 78 and a curved recess 79, which is provided with upturned edge portions forming a rib 80. By providing the recess, the shoulder at 78 is thrown in alignment with the center of the stud 20, as shown in Figs. 5 and 6, thus preventing any possibility of accidental disengagement of the stud by engagement of the straight shoulder 78 with the curved lower edge portion of the head 26 at the shoulder 28. The raised edge portion 80 is provided to strengthen the locking latch 75 where the stud 20 engages with the same. Instead of making the locking member in the form of a plate and the spring of a separate piece of material, the device may be made as shown in Fig. 14. The cap member 44 having the peripheral flange 49 has mounted therein the spring wire member having the curved spring portion 81, the free end 82 of which engages the inner surface of the flange 49, the spring portion 81 being formed substantially on arcs of circles and merging with the locking portion 83, which locking portion 83 is connected by means of the obliquely extending portion 84 with the lip portion 85 which is upturned in a similar manner to the lip 61, and which is U-shaped, being provided with the lugs 86 and 86' which extend through openings 87 and 87' in the cap member to guide the same.

In Fig. 15 is shown a form of fastener which is particularly useful where compactness is desired. In this form of fastener the stud 20' is provided with a flat head 88 and the locking member 43' is provided with a conical flange portion 89, the other parts being substantially as previously described, the cap member 44' being much shallower than the cap 44 due to the compactness of the parts within the same, and the spring 62" being of the form shown in Fig. 12 and Fig. 13. The members 29 and 30 are substantially the same as those shown in Figs. 1 to 3 inclusive, except that the tubular portion 34' is considerably shorter than the portion 34.

It will be seen that in the form shown in Fig. 15 when the head 88 engages with the beveled or conical flange portion 89, that the locking member will be forced under the head in a similar manner to the manner in which the locking latch 43 is forced under the head 26 in Figs. 1 to 3 inclusive.

In Figs. 16 and 17 a slightly modified form of securing means for the cap to the base member is shown. In this form of the device the base plate 30' instead of being provided with slots, as shown at 54 in Fig. 9, is provided with openings or recesses 54' for receiving the tongues 51', said tongues 51' resting in recesses formed by striking up the material at 56' in a similar manner to the upstruck portions 56.

In Figs. 7 and 8 portions of a fastener are shown for securing more than two overlapping portions together. In this form of the device the stud 20" is provided with a head 26" forming a shoulder at 28" and with a flaring portion 90 forming a shoulder at 91, the lower end of the stud being provided with a flange 21", similar to the flange 21, and having a threaded portion 92 for securing the same to a rigid portion of the car upon which the curtains are mounted. In this instance two button members are used, one of which is substantially the same as that shown in Figs. 1 to 3 and the other of which may be flat and of substantially the same internal structure as that shown in Fig. 15 and may be provided with a cap member 93 as shown in Fig. 7, similar in all respects to the cap 44, except that an opening 94 is provided therein through which the stud 20" is adapted to pass.

Having thus described my invention, what I desire to claim and secure by U. S. Letters Patent is:

1. A device of the character described comprising a headed stud, and a member adapted to engage said stud, said member including a slidable locking device adapted to engage under the head of said stud, and a substantially spiral spring for holding said locking device in locking position, said spring having one end secured to said locking device and extending adjacent the periphery of said member but spaced therefrom through substantially a full convolution and having its other end bearing against said member so as to flex through substantially a full convolution upon movement of said locking device.

2. A device of the character described comprising a headed stud, and a member mounted upon flexible material and adapted to engage said stud, said member including a locking member movable into and out of locking position transversely of said stud, and resilient means yieldingly holding said locking member in locking position, said locking member having a gradually upturned curved edged projecting end portion adapted to be engaged by the material upon which said member is mounted to unlock said device.

3. A device of the character described comprising a headed stud, and a member mounted upon flexible material and adapted to engage said stud, said member including a locking member movable into and out of locking position transversely of said stud, and resilient means yieldingly holding said locking member in locking position, said locking member having a projecting end portion adapted to be engaged by the material upon which said member is mounted to unlock said device, said end portion being longitudinally and transversely curved.

4. A device of the character described comprising a headed stud, and a member adapted to engage said stud, said member comprising a locking member having a stud receiving opening therein movable into and out of locking position transversely of said stud, a base member and a cap member secured to said base member and housing said locking member, said base member being provided with a stop engaging the edge of said opening for limiting the outward movement of said locking member and holding said locking member in position to be engaged by said stud.

5. A device of the character described comprising a headed stud and a member adapted to engage said stud, said member comprising a base member, a cap member and a locking member interposed between said base member and cap member, said base member being provided with means projecting upwardly adjacent the center thereof for automatically positioning said locking member relative to the other parts of the device in assembling the same.

6. A device of the character described comprising a headed stud and a member adapted to engage said stud, said member comprising a base member, a cap member and a locking member interposed between said base member and cap member, said base member being provided with means projecting toward said cap for automatically positioning said locking member relative to the other parts of the device in assembling the same, said means guiding said locking member in its movement into and out of locking position.

7. A slidable lock fastener comprising a shouldered stud, a housing mounted on a piece of flexible material, a slidable spring actuated locking plate in said housing having a portion thereof extending through an opening in said housing and beyond the same, said extending portion having an extremity curved in a plurality of directions and having a curved edge, said extremity being adapted to be engaged by the material upon which said housing is mounted to automatically unlock said fastener.

8. The combination with a shouldered stud of a slidable latch lock fastener comprising a housing, a container plate, a slidable latch lock housed between said plate and housing, resilient means for holding said lock in locking position, said housing having short prongs for securing said plate thereto and longer prongs for attaching said fastener to the material upon which the same is mounted, and a material supporting base plate secured to said housing by means of said last mentioned prongs, said base plate having struck-in depressions for accommodating said attaching prongs within the outlines of said fastener.

9. In a device of the character described, a shouldered stud, a fastener comprising a housing, a slidable locking latch in said housing and a band spring member curved on the arcs of circulars in said housing, a convolution of said spring extending around a substantial portion of the inner surface of said housing, and always spaced therefrom to provide a long spring having a relatively short movement due to the movements of said latch.

10. A device of the character described comprising a housing, a base plate and a slidable locking latch within said housing, said base plate having a tubular member projecting through an oblong opening in said latch and said latch having a portion projecting through an opening in said housing whereby said latch is guided in its longitudinal movement, said tubular member having a projection provided with curved corners to automatically locate said latch in assembling said device and having a shoulder to limit the latch in its movement.

In witness whereof, I hereunto subscribe my name this 3rd day of January A. D., 1922.

HELGE A. BORRESEN.